United States Patent
Bassoli et al.

(10) Patent No.: US 6,564,792 B2
(45) Date of Patent: May 20, 2003

(54) DEVICE FOR DE-HUMIDIFYING A COOKING CHAMBER IN AN APPARATUS FOR FOOD COOKING

(75) Inventors: Claudio Bassoli, Carpi (IT); Filippo Ganzerli, San Felice Sul Panaro (IT)

(73) Assignee: Angelo Po Grandi Cucine S.p.A., Carpi (IT)

( * ) Notice: Subject to any disclaimer, the term of this patent is extended or adjusted under 35 U.S.C. 154(b) by 0 days.

(21) Appl. No.: 10/028,911

(22) Filed: Dec. 28, 2001

(65) Prior Publication Data

US 2002/0117162 A1 Aug. 29, 2002

(30) Foreign Application Priority Data

Feb. 28, 2001 (EP) ............................................. 01830139

(51) Int. Cl.[7] .............................. F24D 1/00; B60H 3/00
(52) U.S. Cl. ........................................ 126/21 A; 99/474
(58) Field of Search ............................. 126/21 A, 369; 99/474, 467, 329 R

(56) References Cited

U.S. PATENT DOCUMENTS 3,590,803 A * 7/1971 Sauer ........................... 126/11
4,648,377 A * 3/1987 Van Camp ................ 126/21 A
5,499,577 A * 3/1996 Tommasini .................. 99/476
5,694,835 A * 12/1997 Mangina ...................... 99/468
5,768,982 A * 6/1998 Violi et al. ................... 99/476

FOREIGN PATENT DOCUMENTS

GB        2215177 A  *  9/1989  ............ A21B/1/10

* cited by examiner

Primary Examiner—Henry Bennett
Assistant Examiner—Alfred Basichas
(74) Attorney, Agent, or Firm—Browdy and Neimark PLLC

(57) ABSTRACT

The device comprises an intake pipe which introduces dry external air into a cooking chamber through an intake. The humid air exits through an outlet pipe connected to an outlet of the cooking chamber; the outlet is located higher than the intake. The outlet pipe is provided with a butterfly valve for regulating a warm air flow. A single-acting valve is predisposed on the intake pipe for allowing a flow of air towards the cooking chamber. The device ensures aspiration of dry external air even where there are no means for forced air circulation.

6 Claims, 1 Drawing Sheet

DEVICE FOR DE-HUMIDIFYING A COOKING CHAMBER IN AN APPARATUS FOR FOOD COOKING

BACKGROUND OF THE INVENTION

Specifically, though not exclusively, the present invention is advantageously applied in food-cooking apparatus of the forced-convection type, where the foods are of the sort that release steam, or in steam-cooking apparatus.

A determining factor in obtaining a good cooking quality is the control and regulation of humidity inside the cooking chamber. Experience has taught that simply removing the steam produced by the food during cooking is only poorly effective, if not accompanied by dry-air intake from outside the chamber.

The prior art contains various solutions for sucking external air into the food cooking chamber.

For example, EP 926449 shows a cooking chamber which is dehumidified by aspirating dry air from the outside using a fan located in the cooking chamber. EP 959305 describes some apparatus made according to the preamble of the first claim. A first apparatus comprises a centrifugal compressor predisposed internally of the food cooking chamber, which forces air into the chamber. In a second apparatus, intake of external air into the cooking chamber is controlled by a valve which is normally closed and is electrically commanded to open.

The main aim of the present invention is to provide an apparatus able to dehumidify the cooking chamber by aspirating dry external air; the apparatus is simpler with respect to the prior art.

An advantage of the invention is to enable fresh air to be sent into the cooking chamber even where there are no means for forced circulation of air.

A further advantage is that the invention prevents the return of the air towards the outside through the intake pipe; this is achieved extremely simply and economically.

A further advantage is to enable regulation of the dehumidification of the cooking chamber.

SUMMARY OF THE INVENTION

These aims and advantages and others besides are all attained by the invention as it is characterised in the appended claims. The device comprises an intake pipe which introduces dry external air into a cooking chamber through an intake. The humid air exits through an outlet pipe connected to an outlet of the cooking chamber; the outlet is located higher than the intake. The outlet pipe is provided with a butterfly valve for regulating a warm air flow. A single-acting valve is predisposed on the intake pipe for allowing a flow of air towards the cooking chamber. The device ensures aspiration of dry external air even where there are no means for forced air circulation.

BRIEF DESCRIPTION of the DRAWINGS

Further characteristics and advantages of the present invention will better emerge from the detailed description that follows of a preferred but non-exclusive embodiment of the invention, illustrated purely by way of non-limiting example in the accompanying figure of the drawing, in which.

DESCRIPTION OF THE PREFERRED EMBODIMENTS

Figure 1:
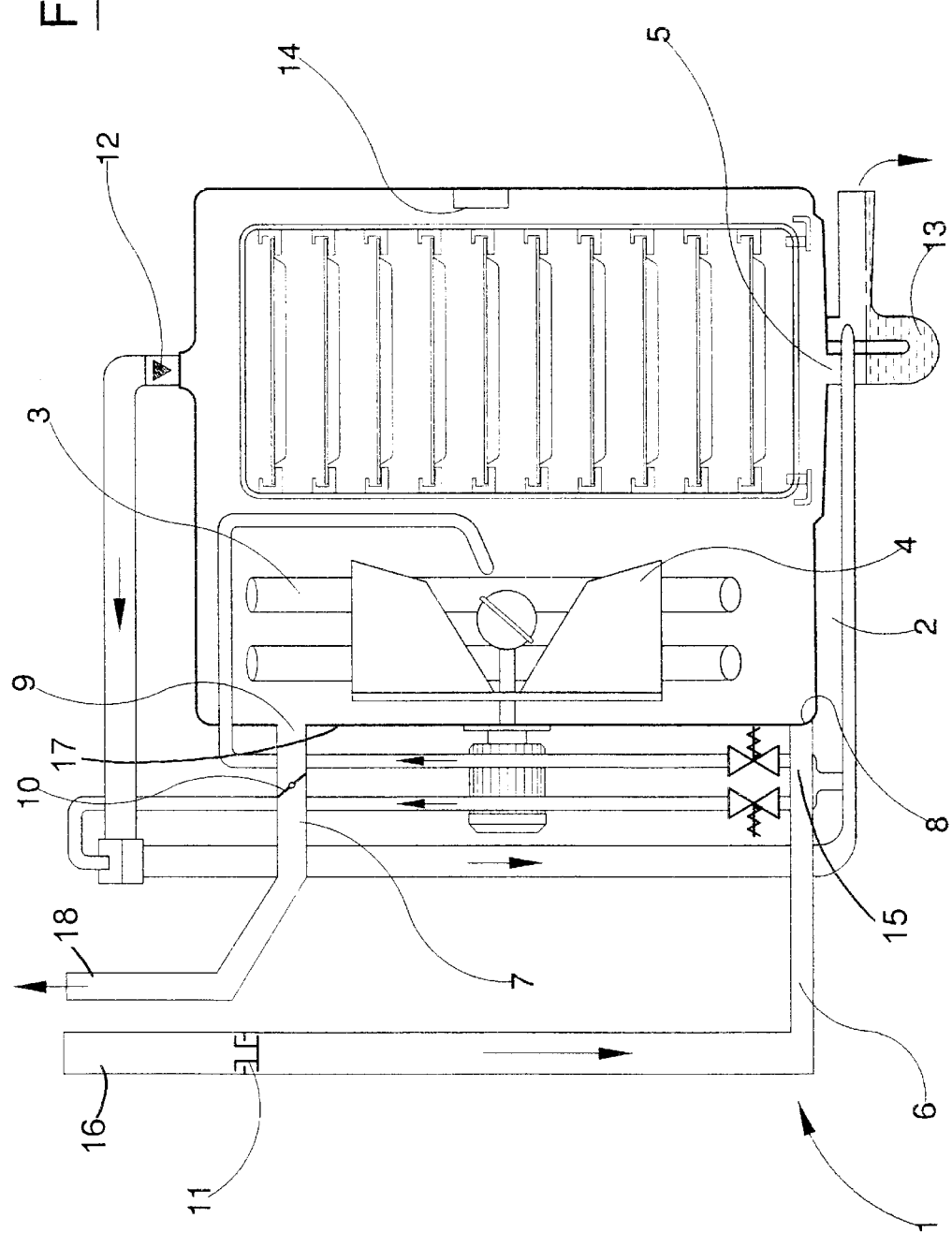
FIG. 1 is a diagram in vertical elevation of an apparatus for cooking foods, provided with a dehumidification device made according to the invention.

With reference to the above-mentioned figure of the drawing, 1 denotes in its entirety a device for dehumidifying a cooking chamber 2 of an apparatus for cooking foods.

The cooking apparatus comprises means for heating 3, of known type, for heating the foods in the cooking chamber 2, a rotary fan 4 inside the cooking chamber with a horizontal rotating axis, for distributing hot air in the cooking chamber, and a discharge 5 predisposed on the bottom of the chamber 2 for evacuating steam and cooking residues.

The dehumidifying device 1 comprises an intake pipe 6 for dry air coming from the outside and an outlet pipe 7 for the humid air. The intake pipe 6 has a first end 15 connected to an inlet 8 into the cooking chamber and a second end 16, opposite to the first end, which is connected to an outside environment, usually the normal atmosphere. The outlet pipe 7 has a first end 17 which is connected to an outlet 9 of the cooking chamber and a second end 18, opposite to the first end, which is connected to an outside environment, again usually the normal atmosphere. The outlet pipe 7 exhibits at least one rising tract and ends with the second end 18 located higher than the first end 17. The intake pipe 6 exhibits one descending tract and begins with the second end 16 situated higher than the first end 15.

The outlet 9 for the humid air is higher than the inlet 8 for the dry air. The outlet 9 for the humid air and the inlet 8 for the dry air are arranged on a same vertical plane, respectively at higher and lower zones of a lateral wall of the cooking chamber situated behind the fan 4. The inlet 8 of the external air is located below the fan 4, while the outlet 9 of the humid air is located above the fan 4. Preferably the passage section of the inlet 8 is greater than the section of the outlet 9.

The dehumidifying device 1 comprises an air-flow intercept device 10 located on the outlet pipe 7. The intercept device 10 comprises an air-flow regulation valve located along the outlet pipe 7. In the illustrated case the regulation valve is a butterfly valve. By adjusting the intercept device 10 the humidity inside the cooking chamber 2 can be regulated.

The dehumidifying device 1 comprises a sensor 14 for regulating the humidity inside the cooking chamber 2 by sending a signal used for controlling the intercept device 10 so that the humidity within the cooking chamber is kept within predetermined limits.

A single-acting valve 11 is predisposed in the intake pipe 6, allowing a flow of air towards the cooking chamber 2. The single-acting valve 11 is closed by effect of an overpressure in the cooking chamber 2. The single-acting valve operates in a substantially vertical tract of the intake pipe 6 and works by gravity. It is provided with a normally open shutter (by effect of the shutter weight it is normally open) which is raised to close by effect of a difference in pressure between the zone below and the zone above the shutter seating. Preferably the cooking chamber 2 is provided with means for producing a slight overpressure inside it. For this purpose the intercept section of the outlet pipe 7 flow regulation valve can be choked. Further, with the same aim of creating an overpressure, the discharge 5 for the steam is provided with a syphon 13. The means for creating an overpressure can also comprise an overpressure valve 12 which opens by effect of a predetermined pressure in the cooking chamber.

The dehumidifying device 1 exploits the natural draught effect (as in a chimney) achievable in the cooking chamber 2, as the outlet 9 is higher up than the inlet 8. The difference in specific weight between the heated gas in the cooking chamber and the cooler outside air causes evacuation of the hot gas through the higher opening (outlet 9) and the sucking of the external air into the cooking chamber 2 through the lower opening (inlet 8).

During operation preferably a slight overpressure is created in the cooking chamber 2, by closing the intercept valve 10 on the outlet pipe 7 either totally or partially. The overpressure is limited by the overpressure valve 12 which is predisposed to open when the pressure in the cooking chamber exceeds a predetermined level, at which the single-acting valve 11 in the intake pipe 6 is closed. The closure of the single-acting valve 11 ensures that the flow is in one direction only through the intake pipe 6. The choking of the intercept valve 10 and the consequent overpressure cause a controlled increase of humidity in the cooking chamber 2.

The subsequent opening of the intercept valve 10 causes firstly the expulsion of the humid air through the outlet pipe 7 and the lowering of the pressure in the cooking chamber 2 up to atmospheric pressure levels, with a consequent slow opening of the single-acting valve 11, which enables external air to be sucked in through the intake pipe 6 and thus a reduction in the humidity level in the cooking chamber.

The position of the butterfly regulation valve influences the degree of humidity in the cooking chamber. The regulation valve is preferably controlled though the means for measuring humidity, either direct or indirect, inside the cooking chamber, according to a preset cooking program, so as to obtain the desired degree of dehumidification.

In a case of sharp reduction of temperature in the cooking chamber, with a consequently rapid condensation, there is a safety measure present which guards against excessive lowering of pressure in the cooking chamber. This safety measure is constituted by the connection with the outside of the single-acting valve 11, though the intake pipe 6.

In an embodiment which is not illustrated, the regulation valve on the outlet pipe can comprise a sealing element operating internally of the outlet pipe and mobile in a normal direction to the flow in the outlet pipe. The sealing element is normally closed by an elastic element and is provided with a mechanical opening organ which can be activated from outside. The sealing element is an axially-mobile piston. The elastic element comprises a compression spring. The mechanical opening element comprises a mechanism of the cam-follower type.

What is claimed:

1. A device for dehumidifying a cooking chamber in an apparatus for cooking food comprising:
    a. at least one intake pipe having a first end connected to an inlet of the cooking chamber, and at least one second end, opposite to the first end, which is connected to an external environment;
    b. at least one outlet pipe having a first end connected to an outlet of the cooking chamber, which outlet is located higher than an inlet to the cooking chamber, and a second end, opposite the first end, which is connected to an external environment;
    c. at least one intercept device of a flow of air predisposed on the at least one outlet pipe, which intercept device comprises a valve for regulating the flow of air along the outlet pipe, comprising a single-acting valve predisposed on the at least one intake pipe for allowing the flow of air to move towards the cooking chamber;
    d. wherein the single-acting valve is closed when the cooking chamber exhibits an overpressure;
    e. wherein the single-acting valve operates in a vertical tract of the at least one intake pipe and is provided with a shutter which is normally retained open by the weight thereof, and which is raised into a closed position by effect f a pressure differential.

2. The device of claim 1, wherein the single-acting valve and the at least one intake pipe act as safety devices in a presence of sharp temperature drops.

3. The device of claim 1, further comprising a sensor which is predisposed to regulate a humidity in the cooking chamber by sending a signal used for controlling the intercept device.

4. The device of claim 1, further comprising means for creating a slight overpressure in the cooking chamber.

5. The device of claim 4, wherein the means for creating a slight overpressure comprise a discharge having a syphon on a bottom of the cooking chamber.

6. The device of claim 5, wherein the means for creating a slight overpressure further comprise an overpressure valve which opens by effect of a predetermined pressure in the cooking chamber.

* * * * *